United States Patent [19]

Dilling

[11] Patent Number: 5,013,825

[45] Date of Patent: May 7, 1991

[54] SULFATION OF LIGNIN

[75] Inventor: Peter Dilling, Isle of Palms, S.C.

[73] Assignee: Westvaco Corporation, New York, N.Y.

[21] Appl. No.: 483,394

[22] Filed: Feb. 22, 1990

[51] Int. Cl.$^5$ ............................................. C08H 5/02
[52] U.S. Cl. ..................................... 530/500; 530/501
[58] Field of Search ......................................... 530/500

[56] References Cited

U.S. PATENT DOCUMENTS

| | | | |
|---|---|---|---|
| 2,379,889 | 7/1945 | Dorland et al. | 106/163.1 |
| 2,688,611 | 9/1954 | Jones | 106/30 |
| 4,597,770 | 7/1986 | Forand et al. | 44/77 |
| 4,739,040 | 4/1988 | Naae et al. | 558/33 |

*Primary Examiner*—Earl Nielsen
*Assistant Examiner*—Frederick Krass
*Attorney, Agent, or Firm*—Daniel B. Reece, IV; Terry B. McDaniel; Richard L. Schmalz

[57] ABSTRACT

A method of producing a sulfated lignin comprising the steps of dissolving lignin in an aqueous alkaline solution, adding an organic amine-sulfur trioxide complex to the dissolved lignin, and reacting the amine-sulfur trioxide complex with the lignin under conditions to sulfate the same.

9 Claims, No Drawings

SULFATION OF LIGNIN

The present invention is directed to the production of sulfated lignins suitable for use as chemical additives in other chemical compositions and processes, and, more particularly, to lignin sulfated with sulfur trioxide-amine complexes.

BACKGROUND OF THE INVENTION

Lignin is a complex, high-molecular weight polymer occuring naturally in close association with cellulosic plants and trees. In the paper-making industry, lignin may be recovered as a by-product of the cellulose product by two principal wood-pulping processes known as the sulfite process and the kraft process. The sulfite process lignin is solubilized from the cellulosic portion of the wood pulp by direct sulfonation, while the kraft process is based on alkaline degradation mechanism causing cleavage of -aryl ether linkages in the polymeric lignin which sequentially result in chemical functions of the phenolic and carboxylic type. Kraft process lignin generally is isolated by acid precipitation of the black liquor of the pulping process at a pH below the pKa of the phenolic groups.

Lignin products are widely employed as additives in various chemical processes and compositions. Because of the high degree of chemical activity characteristic of lignin, it has been variously employed as a surfactant, extender, dispersant, reinforcement, solvent, binder, sequestering agent, emulsifier and emulsion stabilizer, and as a stabilizing and protecting colloid. Lignin is sold under the trademark INDULIN ® by Westvaco Corporation of North Charleston, S.C.

Sulfonated lignin compounds, particularly sodium salts of lignosulfonates, are widely employed as additives and dispersants in textile dyestuffs and printing pigments, and have been sold for a number of years under the trademarks POLYFON ® and REAX ® by Westvaco Corporation. The degree of sulfonation of lignin generally determines its water solubility at various pH levels, e.g., sodium salts of sulfonated lignins are generally water soluble at alkaline and higher oH levels, while they are water insoluble at lower, or acid, pH levels.

My co-pending, commonly assigned U.S. patent application Ser. No. 07/298,677 filed Jan. 19, 1989 and Ser. No. 07/324,320 filed Mar. 16, 1989 describe the production of sulfonated lignin compositions having a high degree of sulfonation and water solubility by the reaction of lignin starting materials with sulfuric acid and oleum, respectively. In sulfonation of lignins, the sulfonic acid groups resulting from the sulfonation reaction attach directly to the aromatic ring of lignin in an ortho-position, relative to the principal lignin sidechain, as illustrated by the formula:

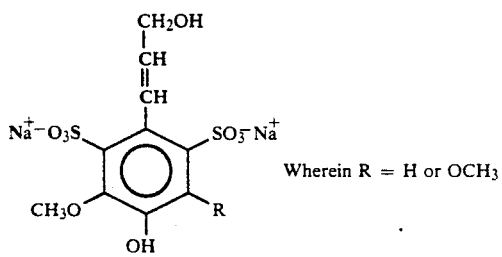

Wherein R = H or OCH₃

Sulfonation of lignins may also be carried out by a sulfomethylation process in which the lignin material is first methylolated with a suitable methylolating agent, such as formaldehyde, and thereafter treated with a sulfite or bisulfite salt, e.g., sodium bisulfite, to attach the sulfonic acid qroups to the methylol sidechain adjacent the phenol groups of the lignin material, as illustrated by the formula:

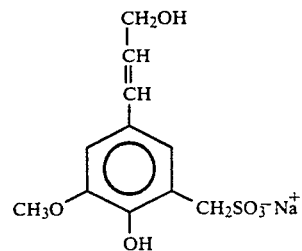

Sulfonation of lignins may also be carried out by sulfonation of the side chain of the lignin to produce a POLYFON ® lignin product, as illustrated by the formula:

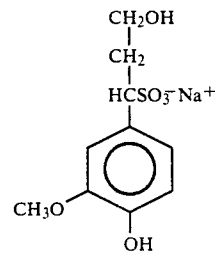

In U.S. Pat. No. 2,688,611, it has been proposed to produce lignin sulfates by treatment of lignin materials with a SO₃-group-containing compound selected from the group consisting of alkali metal chlorosulfonates, group II-A metal chlorosulfonates, and sulfur trioxide amine complexes in an anhydrous medium to produce sulfated lignins involving the hydroxyl groups of the phenol ring components of the lignin.

Highly sulfonated lignins are desirable for improved water solubility and in high electrolyte-containing applications, such as lignin additives in oil well drilling fluids, certain dyestuffs, ink formulations, micronutrients, concrete, and cement. Although salts negatively impact lignin solubility below the ionic charge requirements of such systems, solubility compensations can be made by increasing the sulfonic acid content of the lignin.

Solubility of the sulfated or sulfonated liqnin may be expressed in terms of its acid point, or acid precipitation point or number, which is the number of grams of a 50% concentration of sulfuric acid needed to start precipitation of a 35 milliliter solution of 0.5 weight percent lignin. As expressed, the higher the acid point of the lignin, the greater sulfonic acid/sulfate content and water solubility of the same.

BRIEF OBJECTS OF THE PRESENT INVENTION

It is an object of the present invention to provide a method of producing a sulfated lignin having a high sulfur content and excellent water solubility.

It is another object to provide a sulfated lignin product having a high degree of sulfated groups, such that it may be used in applications requiring high degrees of water solubility of the lignin additive.

It is a further object to provide an improved process for producing sulfated lignins by reaction thereof with an organic aminesulfur trioxide complex in aqueous medium.

SUMMARY OF THE INVENTION

The present invention is directed to a method of producing a sulfated lignin having high sulfation content and excellent water solubility wherein lignin, in aqueous solution, is reacted with an organic amine-sulfur trioxide complex, in particular a complex selected from the group consisting of pyridine-sulfur trioxide, triethyleneamine-sulfur trioxide, and trimethylamine-sulfur trioxide, under conditions to cause sulfation of the lignin at the ionized hydroxyl group ($O^{-}Na^{+}$) of the organic phenolic nucleus, as illustrated by the formula:

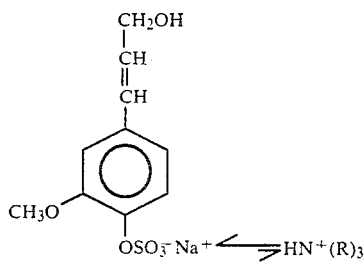

The amount of lignin dissolved in aqueous solution may be varied typically from about 5 to about 50% by weight solids, depending upon the degree of sulfation desired. Typically, about 15–35% by weight, preferably about 25% by weight solids lignin, may be dissolved in aqueous solution under alkaline conditions and the selected organic amine-sulfur trioxide complex reacted therewith at temperature and time conditions which effectively cause sulfation of the same in aqueous medium.

For optimum sulfation, it is preferred that the pH of the aqueous solution be as high as practicable. The amount of the amine-sulfur trioxide complex employed may vary, depending upon the degree of sulfation desired in the lignin product. If a low degree of sulfation is desired, less of the complex may be employed, and, correspondingly, if a high degree of sulfation is desired, more complex will be employed in the reaction. Typically, the amount of complex may vary between from about 1 mole to about 5 moles complex per 1,000 gram mole of lignin in solution. Optimum reaction temperatures will vary, depending upon the particular amine-sulfur trioxide complex selected. Optimum reaction time is gerally about the same, or approximately 60 minutes.

DETAILED DESCRIPTION AND EXAMPLES

The various parameters of the invention and the effect of temperature, concentrations, and reaction pH on the acid points obtained in the reacted lignin products may be illustrated by the following examples and data calculated therefrom. Amounts of unsulfonated lignin, e.g., INDULIN lignin, and previously sulfonated lignins, e.g., REAX ® and POLYFON ®, are employed as starting lignin materials, aqueous solution samples thereof are reacted with various complexes of pyridine-sulfur trioxide, triethylene-sulfur trioxide, and trimethylene sulfur trioxide. Reactions are carried our for approximately 60 minutes and the acid points of the final products are presented in the following tables:

| | PYRIDINE - SULFUR TRIOXIDE COMPLEX | | | | |
|---|---|---|---|---|---|
| Lignin | Moles of Complex/ 1000 gm mole Lignin | Reaction Temperature (°C.) | Lignin Concentration in Aqueous Solution (%) | Reaction pH | Acid Point |
| | Temperature Profile | | | | |
| INDULIN (Control) | 0 | — | — | — | 0.2 |
| INDULIN | 5 | 75 | 25 | 11.0 | 6.5 |
| INDULIN | 5 | 100 | 25 | 11.0 | 2.8 |
| INDULIN | 5 | 25 | 25 | 11.0 | 18.9 |
| INDULIN | 6 | 25 | 25 | 11.0 | 19.1 |
| | pH Profile | | | | |
| INDULIN | 5 | 25 | 25 | 7 | 1.2 |
| INDULIN | 5 | 25 | 25 | 9 | 9.7 |
| INDULIN | 5 | 25 | 25 | 10 | 13.4 |
| INDULIN | 5 | 25 | 25 | 12 | 17.3 |
| REAX 85 | 0 | — | — | — | 1.8 |
| REAX 85 | 5 | 25 | 25 | 11.0 | 42.9 |
| REAX 85 | 5 | 50 | 25 | 11.0–4.0 | 16.3 |
| REAX 85 | 3 | 25 | 25 | 7.0 | 19.0 |
| REAX 85 | 1 | 25 | 25 | 11.0 | 6.4 |
| REAX 83 | 0 | — | — | — | 9.7 |
| REAX 83 | 5 | 25 | 25 | 11.0 | 180 |
| REAX 88 | 0 | — | — | — | 14.7 |
| REAX 88 | 5 | 25 | 25 | 11.0 | totally soluble |
| POLYFON 0 | 0 | — | — | — | 3.5 |
| POLYFON 0 | 5 | 25 | 25 | 11.0 | 73.0 |

| TRIETHYLAMINE - SULFUR TRIOXIDE COMPLEX Temperatue Profile | | | | | |
|---|---|---|---|---|---|
| Lignin | Moles of Complex | Reaction Temperature (°C.) | Lignin Concentration (%) | Reaction pH | Acid Point |
| INDULIN | 5 | 25 | 25 | 11.0 | 4.6 |

TRIETHYLAMINE - SULFUR TRIOXIDE COMPLEX
Temperatue Profile

| Lignin | Moles of Complex | Reaction Temperature (°C.) | Lignin Concentration (%) | Reaction pH | Acid Point |
|---|---|---|---|---|---|
| INDULIN | 5 | 50 | 25 | 11.0 | 14.1 |
| INDULIN | 5 | 70 | 25 | 11.0 | 14.7 |
| INDULIN | 5 | 90 | 25 | 11.0 | 14.1 |

TRIMETHYLAMINE - SULFUR TRIOXIDE COMPLEX
Temperature Profile in Relation to Molar Ratios of Complex and Lignin Concentration

| Lignin | Moles of Complex | Reaction Temperature (°C.) | Lignin Concentration (%) | Reaction pH | Acid Point |
|---|---|---|---|---|---|
| INDULIN | 5 | 25 | 25 | 11.0 | 3.6 |
| INDULIN | 5 | 40 | 25 | 11.0 | 4.1 |
| INDULIN | 5 | 60 | 25 | 11.0 | 17.2 |
| INDULIN | 5 | 90 | 25 | 11.0 | 19.9 |
| INDULIN | 1 | 90 | 15 | 11.0 | 1.0 |
| INDULIN | 1 | 90 | 25 | 11.0 | 1.8 |
| INDULIN | 1 | 90 | 33.8 | 11.0 | 2.3 |
| INDULIN | 3 | 90 | 33.8 | 11.8 | 14.9 |

From the foregoing data, it can be seen that temperatures for achieving optimum sulfation of lignin are dictated by the type of complex employed in the reaction. As seen in the tables, the pyridine-sulfur trioxide complex reaction appears to work best at about 25° C., while the trimethylamine complex yielded optimum results at 90°–100° C. reaction temperature. Optimum temperature for reaction of the triethylamine complex is about 60° C. Also, the degree of sulfation increases when the concentration of lignin in aqueous solution is increased.

As seen from the data, acid number and water solubility of previously sulfonated lignins, such as the REAX ® and POLYFON ® lignins produced by Westvaco, may also be increased by sulfation in accordance with the method of the present invention, wherein the hydroxyl ion on the aromatic phenolic nucleus of the lignin is sulfated.

Since both sulfonic and sulfate acid groups exist at about the same pKa, namely 1.7, acid point concentrations can be used interchangably for determining the degree of reaction conversion. For example, when a sulfonated precursor, e.g., REAX ® and POLYFON ® lignin, is sulfated, the acid point difference between the precursor and the sulfated lignin indicates the amount of sulfated groups which were incorporated into the lignin backbone.

Lignin sulfation in aqueous solution provides several advantages over conventional lignin sulfonation of the prior art. These include an increase in reaction speed as reaction at pH 11 is complete within one hour, while generally longer periods of reaction, e.g., 6–12 hours are required for sulfomethylation [atmospheric] and about 2 hours for sulfonation (under pressure). Also, phenol blocking occurs simultaneously with sulfation, resulting in a sulfated product lighter in color, lower in fiber stain, and generally lower in azo dye reduction than the sulfonated and sulfomethylated lignins of the prior art. Since the buffering capacity of the phenols in conventional lignins is largely eliminated during sulfation, pH adjustments may be made more easily. Pure sulfated lignins may be more biodegradable than their sulfonated or sulfomethylated counterparts, since sulfated groups are quite susceptible to cleavage, which eliminates the stabilization effect of sulfonated structures.

The following example illustrates one specific laboratory procedure for making sulfated lignin with 3 moles of trimethylamine-sulfur trioxide complex:

340 grams of 34% aqueous Indulin A lignin slurry (100 grams dried lignin) is causticized to a pH of 11 using a 50% sodium hydroxide solution. The temperature is raised to 90° C., at which point 41.7 grams of the trimethylamine-sulfur trioxide complex is added. The pH is maintained at 11 with sodium hydroxide, and after 60 minutes, free trimethyamine is removed in a rotating evaporator. The resulting sulfated sodium salt lignin is subsequently spray dried. The degree of sulfation is quantitatively determined by acid point and quantitatively determined by organic sulfur analysis. Acid point is determined by titrating 35 milliliters of 0.5% lignin solution with 50% sulfuric acid to the point where lignin precipitation begins. Sulfuric acid is added dropwise at 1 second intervals and the amount of tritant relates quantitatively to the degree of sulfation of the lignin.

Organic sulfur is quantitatively analyzed by washing 5 grams of the lignin sulfate free of inorganic salts by ultrafiltration (the point where the eluent is equal in conductance to the wash water concludes the ultrafiltration process). A 500 molecular weight membrane by the Amicon Corporation is used, the resultant pure lignin sulfate is dried in a convection oven, and sulfur determined with a LECO analyzer. In calculating organic lignin sulfate value, any existing sulfur in the starting lignin (Indulin A) must be substracted from the total sulfur obtained with the LFCO analyzer.

That which is claimed is:

1. A method of producing sulfated lignin comprising the steps of dissolving lignin in an aqueous alkaline solution, adding an organic amine-sulfur trioxide complex to the dissolved lignin, and reacting the amine-sulfur trioxide complex with the lignin under conditions to sulfate the same wherein the lignin concentration in solution is at least 25% solids by weight and the reaction is carried out for up to about one hour.

2. A method as defined in claim 1 wherein the lignin concentration in solution is from about 25 to 50% solids by weight.

3. A method as defined in claim 1 wherein the sulfur-amine trioxide complex is reacted for 60 minutes to produce the sulfated lignin.

4. A method as defined in claim 1 wherein the amine-sulfur trioxide complex is reacted with lignin at a temperature between about 25° C. and the boiling point of the lignin solution.

5. A method as defined in claim 4 wherein the amine-sulfur trioxide complex is pyridine and sulfur trioxide and the reaction temperature is about 25° C.

6. A method as defined in claim 4 wherein the amine-sulfur trioxide complex is triethylamine and sulfur trioxide and the reaction temperature is about 70° C.

7. A method as defined in claim 4 wherein the amine-sulfur trioxide complex is trimethylamine and sulfur trioxide and the reaction temperature is about 90° C.

8. A method as defined in claim 1 wherein the lignin to be reacted is previously sulfonated lignin.

9. A method as defined in claim 1 wherein the pH of the alkaline lignin solution is about 11.

* * * * *